Patented Dec. 14, 1948

2,455,961

UNITED STATES PATENT OFFICE 2,455,961

HYDRAULIC FLUID

Kenneth E. Walker, Wilmington, Del., assignor to E. I. du Pont de Nemours & Company, Wilmington, Del., a corporation of Delaware No Drawing. Application June 10, 1944, Serial No. 539,779

8 Claims. (Cl. 252—75)

This invention relates to fluid compositions for use in devices operated by fluid pressure, such as hydraulic brakes, clutches, shock absorbers, aircraft and ship control mechanisms, artillery recoil mechanisms, door checks, jacks and other such hydraulic devices adapted for transfer of mechanical energy.

In the past it was recognized that hydraulic fluids in general should be non-corrosive, non-foaming, stable liquids which do not congeal at the low temperatures encountered in their use, and do not gasify at the elevated temperatures to which they may be subjected. It was also considered important that such compositions should not deteriorate rubber or other sealing materials with which they might come in contact, and also that they should have sufficient viscosity over a wide temperature range to permit smooth operation of the mechanism without danger of loss of the fluid.

The hitherto known fluids which possessed these desirable properties in even moderate degree were generally inflammable liquids which were not suited to use under conditions requiring high ignition temperature. However, non-inflammability, as shown by high ignition temperature and other tests, is now recognized as being an important desirable property in such fluids, particularly, of course, in warfare. Accordingly, none of the hitherto commercially available hydraulic fluids was satisfactory in all of the characteristics now recognized as being desirable and important in such compositions for certain uses.

An object of the present invention is to provide a hydraulic fluid composition which is very difficult to ignite under all types of conditions, and in addition has the other characteristics which are desirable in hydraulic fluids. Another object is to provide a composition which has a very low change of viscosity with temperature, and a suitable viscosity for use in hydraulic mechanisms over an unusually wide range of temperature. Still another object is to provide a composition which is a satisfactory lubricant for hydraulic apparatus and remains stable, non-corrosive, and relatively non-inflammable even after being subjected to the high shearing stresses encountered in hydraulic systems containing high speed piston, gear or vane pumps, or other similar mechanisms.

These and other objects are accomplished in accordance with this invention by providing a composition containing water, a soluble thickener, and a compound selected from the group consisting of polyhydric alcohols and polyhydric alcohol ethers. The term "soluble thickener" as used in this specification refers to those thickeners which are soluble in water-polyhydric alcohol mixtures or in mixtures of water with polyhydric alcohol ethers. Generally such thickeners are of a resinous nature, and have molecular weights in excess of about 1000. Simple sugars and other simple crystalline compounds are not included as thickeners. In addition, there may be present in the composition a corrosion inhibitor. Suitable inhibitors include the alkali metal borates, phosphates, nitrites, phosphites and silicates; amines such as morpholine, or ethanolamine; and similar commercially available inhibitors such as sodium borophosphate.

The polyhydric alcohols and polyhydric alcohol ethers include ethylene glycol, diethylene glycol, triethylene glycol, liquid polyethylene glycols, beta-hydroxyethyl formal, monomethyl ether of ethylene glycol, monoethyl ether of ethylene glycol, monobutyl ether of ethylene glycol, propylene glycol, polypropylene glycol, diethylene glycol monomethyl ether, diethylene glycol monoethyl ether, diethylene glycol monopropyl ether, diethylene glycol monobutyl ether, glycerol, 1,3-butylene glycol, and the like. Of these, the preferred compounds in the practice of this invention are the polyhydric alcohols having 2 to 5 carbon atoms, especially ethylene glycol.

Suitable soluble thickeners include hydroxyalkyl cellulose, gum arabic, gum ghatti, gum tragacanth, salts of cellulose glycolic acids, ethyl bromide addition products of either the polyvinyl pyridine or the styrene-vinyl pyridine co-polymers described in German Patent 695,098, and the water-soluble derivatives of the synthetic linear polyamides; and, also, as a preferred group, the water-soluble synthetic resins including polyvinyl alcohol, and salts of salt-forming acrylic resins (such as alkali metal polyacrylates and polyalkacrylates).

Included among the soluble thickeners, for the purposes of the present invention, are water-soluble synthetic polyamide derivatives, particularly the alkali metal salts of N-(carboxyalkoxymethyl)-polyamides, which contain the recurring grouping

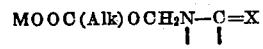

in which M is an alkali metal, Alk is an alkylene group, and X is a member of the group consisting of oxygen and sulfur. Such salts may be prepared by saponification of the product obtained by condensing methyl hydroxyacetate, or similar ester of a hydroxy acid, with formaldehyde and a polyamide in the presence of an acid catalyst, as disclosed in the copending Cairns application S. N. 445,635 (now abandoned), filed June 3, 1942. The polyamides of which the N-(carboxyalkoxymethyl) derivatives form salts which can be used in accordance with the present invention include the polyamides of the general type described in U. S. Patents 2,071,250, 2,071,253 and 2,130,948. Suitable polyamides are, for example, polyhexamethylene adipamide, or the polyamides derived by reacting hexamethylene diamine or decamethylene diamine with sebacic acid or sebacic acid and ethylene glycol. It is not essential that all of the nitrogen atoms in the polyamide molecule be attached to -(carboxyalkoxymethyl) groups (or the salts thereof) although there should be a sufficient number of such groups per molecule to make the polymer soluble. The preferred potassium salts of N-(carboxymethoxymethyl)-hexamethylene polyadipamides are prepared by saponifying the methyl esters of N-(carboxymethoxymethyl) - hexamethylene polyadipamides, which are obtained by the Cairns method mentioned above. These esters having saponification values in the range of about 100 to 160 (corresponding to about 38% to 100% substitution of the polyamide amido hydrogen by

groups) can be used as thickeners in accordance with this invention. For best results, the saponification value of the methyl ester from which this salt is made should be at least about 130. The phenol viscosity of the ester is usually in the range of about 60 to 75. Phenol viscosity is the viscosity in centipoises at 25° C. of a solution containing 5 grams of resin in 100 c. c. of an 85% phenol-15% water solution.

While the soluble thickeners are, as a class, generally applicable in accordance with this invention, it is frequently convenient to choose a particular soluble thickener to accomplish a specific task. Thus, for example, when the fluid is to be used in hydraulic systems containing mechanically driven pumps, the molecular weight of the thickening agent is important. Such systems exert a considerable shearing stress on the liquid, causing a permanent viscosity loss if the polymer has a high molecular weight and is subject to shear. Hence, a thickening agent of relatively low molecular weight, i. e., less than 25,000, frequently about 5000 to 10,000 would be chosen for this particular purpose. In general the soluble thickeners of this invention have molecular weights of at least 1000, and for most applica-
tions of the invention the thickeners having a molecular weight of about 5,000 to 25,000 are preferred.

The range of proportions of the various constituents of the invention may vary widely. Good results, from the standpoint of lessened inflammability and other desirable properties, are obtained with a composition containing 0.2 to 30 grams of the soluble resin per 100 c. c. of a base mixture containing 5% to 70% water, by volume, the remainder being a compound selected from the group consisting of polyhydric alcohols and polyhydric alcohol ethers. The amount of thickener used depends upon the type and mol weight of the thickener, the fluid viscosity desired and the composition of the base fluid. About 0.1 to 5.0 grams of the corrosion inhibitor may also be added. The preferred corrosion inhibitor is borax. A suitable composition contains 2 to 30 grams of the resin (such as potassium polymethacrylate, solid ethylene oxide polymer or the potassium salt of N-(carbomethoxymethyl)-polyhexamethylene adipamide) per 100 c. c. of the base mixture which, in the preferred composition, is an aqueous ethylene glycol solution containing 35% to 65% by volume of ethylene glycol, and about 1% by weight of borax.

The invention contemplates a hydraulic fluid comprising 0.2 to 30 grams of soluble thickener per 100 cubic centimeters of a base mixture containing 30% to 95% by volume of a polyhydric alcohol, the remainder of the base mixture being water.

The following table lists several representative compositions which, in accordance with this invention, have excellent hydraulic fluid properties and are very difficult to ignite.

*Table—Properties of Hydraulic Fluid Compositions*

| Constituents of the Fluid | Viscosity (Centistokes) | | | Viscosity-Temperature Curve Slope | Pour Point |
| --- | --- | --- | --- | --- | --- |
| | −40° F. | 0° F. | 100° F. | | |
| 1. 1.0 gram potassium salt of polyacrylic acid, 1.0 gram sodium phosphate, 100 c. c. base mixture containing 45 volume per cent ethylene glycol and 55 volume per cent water. | | 234 | 27.3 | 0.495 | below −20° F. |
| 2. 6.8 grams potassium salt of polymethacrylic acid, 100 c. c. base mixture containing 45 volume per cent ethylene glycol and 55 volume per cent water. | | 276 | 26.9 | 0.535 | Do. |
| 3. 7.1 grams polyvinyl alcohol RH-623, 0.6 gram polyvinyl alcohol RH-488 (made by Electrochemicals Dept. of du Pont Co.), 1.0 gram butyl phosphate, 0.5 gram KOH, 1.0 gram NaNO₂, 100 c. c. base mixture containing 45 volume per cent ethylene glycol and 55 volume per cent water. | | 524 | 26.7 | 0.647 | Do. |
| 4. 1.53 grams potassium salt of N-(carboxymethoxymethyl)-polyhexamethylene adipamide, 1.0 gram borax, 100 c. c. base mixture containing 60% ethylene glycol by volume and 40% water by volume. | 725 | | 11.75 | 0.660 | below −60 F. |
| 5. 1.5 grams potassium salt of N-(carboxymethoxymethyl)-polyhexamethylene adipamide, 1.0 gram borax, 100 c. c. of base mixture containing 70% by volume diethylene glycol, monoethyl ether and 30% by volume water. | 3,300 | | 13.6 | 0.770 | Do. |
| 6. 3.6 grams potassium salt of polymethacrylic acid, 2.0 grams of potassium phosphate, 100 c. c. of base mixture containing 45% by volume ethylene glycol-55% by volume water. | | 290 | 29.7 | 0.515 | below −20° F. |
| 7. 19.6 grams gum arabic 100 c. c. of base mixture containing 45% by volume ethylene glycol-55% by volume water. | | 428 | 29 | 0.590 | Do. |
| 8. 0.4 gram sodium carboxymethyl cellulose sold commercially as Carcel N high viscosity grade, 1.0 gram borax, 100 c. c. of base mixture containing 45% by volume ethylene glycol-55% by volume water. | | 234 | 27.6 | 0.494 | below 0° F. |
| 9. 2.9 grams styrene-2-vinyl pyridine copolymer ethyl bromide addition product, 100 c. c. base mixture containing 45% ethylene glycol by volume and 55% water by volume. | | 142 | 25 | 0.423 | Do. |
| 10. 2.5 grams polymerized 2-vinyl pyridine ethyl bromide addition product, 100 c. c. base mixture containing 45% ethylene glycol by volume and 55% water by volume. | | 254 | 29.9 | 0.487 | Do. |

It will be understood that inflammability of such fluids as those mentioned above may be tested for by various methods such as (1) spontaneous ignition temperature, (2) flash point, (3) percentage of oxygen in nitrogen required to burn the atomized fluid under controlled conditions, and (4) ignition by incendiary bullets. By all of these tests the fluids described in the Table are either non-inflammable, or are very much less inflammable than the customary, commercial hydraulic fluid compositions.

Since many apparently different embodiments of the present invention may be made without departing from the spirit and scope thereof, it will be understood that we do not limit ourselves except as set forth in the appended claims.

I claim:

1. A hydraulic fluid consisting essentially of a base mixture of water and from 30% to 95% by volume of ethylene glycol having dissolved therein a soluble thickener of the class consisting of ethyl bromide addition product of polyvinyl pyridine, ethyl bromide addition poduct of styrene-vinyl pyridine co-polymer, polyvinyl alcohol, alkali metal polyacrylates, alkali metal polyalkacrylates, and alkali metal salts of N-(carboxyalkoxymethyl) - polyamides, said soluble thickener having a molecular weight in excess of 1000 and being present in the proportion of from 1 to 30 grams per 100 cubic centimeters of the said base mixture.

2. A hydraulic fluid consisting essentially of a base mixture of water and from 30% to 95% by volume of a polyhydric alcohol having 2 to 5 carbon atoms inclusive, a corrosion inhibitor and a soluble thickener dissolved in the said base mixture, said soluble thickener being a member of the class consisting of ethyl bromide addition product of polyvinyl pyridine, ethyl bromide addition product of styrene-vinyl pyridine co-polymer, polyvinyl alcohol, alkali metal polyacrylates, alkali metal polyalkacrylates, and alkali metal salts of N-(carboxyalkoxymethyl)-polyamides, said soluble thickener having a molecular weight in excess of 1000 and being present in the proportion of 1.0 to 30 grams per 100 cubic centimeters of the said base mixture.

3. A hydraulic fluid consisting essentially of a base mixture of water and from 30% to 95% by volume of ethylene glycol having dissolved therein borax and a soluble thickener of the class consisting of ethyl bromide addition product of polyvinyl pyridine, ethyl bromide addition product of styrene-vinyl pyridine co-polymer, polyvinyl alcohol, alkali metal polyacrylates, alkali metal polyalkacrylates, and alkali metal salts of N-(carboxyalkoxymethyl)-polyamides, said soluble thickener having a molecular weight in excess of 1000 and being present in the proportion of 1.0 to 30 grams per 100 cubic centimeters of the said base mixture.

4. A hydraulic fluid consisting essentially of a base mixture of water and from 30% to 95% by volume of a compound selected from the group consisting of polyhydric alcohol and polyhydric alcohol ethers, said base mixture having dissolved therein a corrosion inhibitor and a soluble thickener of the class consisting of ethyl bromide addition product of polyvinyl pyridine, ethyl bromide addition product of styrene-vinyl pyridine co-polymer, polyvinyl alcohol, alkali metal polyacrylates, alkali metal polyalkacrylates, and alkali metal salts of N-(carboxyalkoxymethyl)-polyamides, said soluble thickener having a molecular weight in excess of 1000 and being present in the proportion of 1.0 to 30 grams per 100 cubic centimeters of the said base mixture.

5. A hydraulic fluid consisting essentially of a base mixture of water and from 30% to 95% by volume of a compound selected from the group consisting of polyhydric alcohol and polyhydric alcohol ethers, said base mixture having dissolved therein borax and a soluble thickener, said soluble thickener being a member of the class consisting of ethyl bromide addition product of polyvinyl pyridine, ethyl bromide addition product of styrene-vinyl pyridine co-polymer, polyvinyl alcohol, alkali metal polyacrylates, alkali metal polyalkacrylates, and alkali metal salts of N-(carboxyalkoxymethyl)-polyamides, said soluble thickener having a molecular weight in excess of 1000 and being present in the proportion of 1.0 to 30 grams per 100 cubic centimeters of the said base mixture.

6. A hydraulic fluid consisting essentially of 0.2 to 30 grams of a soluble thickener of molecular weight in excess of about 1000 and 0.1 to 5.0 grams of a corrosion inhibitor, per 100 cubic centimeters of a base mixture, said soluble thickener and corrosion inhibitor being dissolved in the said base mixture, said base mixture consisting essentially of water and from 30% to 95% by weight of a polyhydric alcohol having from 2 to 5 carbon atoms inclusive per molecule, said soluble thickener being a member of the class consisting of ethyl bromide addition product of polyvinyl pyridine, ethyl bromide addition product of styrene-vinyl pyridine co-polymer, polyvinyl alcohol, alkali metal polyacrylates, alkali metal polyalkacrylates, and alkali metal salts of N-(carboxyalkoxymethyl)-polyamides.

7. A hydraulic fluid composition consisting essentially of about 1.0 to 30 grams of a soluble thickener of molecular weight in excess of about 1000, and 0.1 to 5.0 grams of a corrosion inhibitor, per 100 cubic centimeters of a base solution consisting essentially of water and from 30 to 95% by volume of ethylene glycol, said soluble thickener being an alkali metal salt of polymethacrylic acid.

8. A hydraulic fluid composition consisting essentially of about 1.0 to 30 grams of a soluble thickener of molecular weight in excess of about 1000, and 0.1 to 5.0 grams of a corrosion inhibitor, per 100 cubic centimeters of a base solution consisting essentially of water and from 30 to 95% by volume of ethylene glycol, said soluble thickener being potassium polymethacrylate.

KENNETH E. WALKER.

REFERENCES CITED

The following references are of record in the file of this patent:

UNITED STATES PATENTS

| Number | Name | Date |
|---|---|---|
| 1,630,828 | Campbell | May 31, 1927 |
| 1,911,195 | Kepfer | May 30, 1933 |
| 1,928,956 | Tatter | Oct. 3, 1933 |
| 1,976,679 | Fikentscher et al. | Oct. 9, 1934 |
| 2,058,899 | Matheson | Oct. 27, 1936 |
| 2,060,110 | Paxton | Nov. 10, 1936 |
| 2,071,482 | Winning et al. | Feb. 23, 1937 |
| 2,091,627 | Bruson | Aug. 31, 1937 |
| 2,102,825 | Woodhouse | Dec. 21, 1937 |
| 2,104,408 | Wiezevich | Jan. 4, 1938 |
| 2,147,395 | Bayes | Feb. 14, 1939 |
| 2,152,683 | Eichwald | Apr. 4, 1939 |
| 2,213,423 | Wiezevich | Sept. 3, 1940 |
| 2,236,662 | Wright | Apr. 1, 1941 |
| 2,264,363 | Clapsadle et al. | Dec. 2, 1941 |
| 2,264,388 | Lamprey | Dec. 2, 1941 |

FOREIGN PATENTS

| Number | Country | Date |
|---|---|---|
| 340,294 | Great Britain | Dec. 29, 1930 |